(12) United States Patent
Kashiwa

(10) Patent No.: US 8,141,690 B2
(45) Date of Patent: Mar. 27, 2012

(54) CURRENT COLLECTING CONTACT MEMBER

(75) Inventor: Makoto Kashiwa, Hiroshima-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 353 days.

(21) Appl. No.: 12/179,534

(22) Filed: Jul. 24, 2008

(65) Prior Publication Data
US 2009/0205915 A1   Aug. 20, 2009

(30) Foreign Application Priority Data

Feb. 18, 2008   (JP) ................................. 2008-035833

(51) Int. Cl.
*B60L 5/00* (2006.01)
(52) U.S. Cl. ..................................................... 191/45 R
(58) Field of Classification Search ................ 191/45 R, 191/46–51; 174/68.1, 68.2, 70 B, 70 C; 439/1, 439/34, 207, 217, 883
See application file for complete search history.

(56) References Cited

FOREIGN PATENT DOCUMENTS

| GB | 2428657 A | | 2/2007 |
|---|---|---|---|
| JP | 3-14883 Y2 | | 4/1991 |
| JP | 10-327501 | * | 12/1998 |
| JP | 10327501 | | 12/1998 |
| JP | 11243602 A | | 9/1999 |
| JP | 2000069602 A | | 3/2000 |

OTHER PUBLICATIONS

Korean Office Action for Application No. 2008-0074692 issued May 11, 2010.
GCC Office Action for GCC/CN2011/000177 mailed Sep. 1, 2011.

* cited by examiner

*Primary Examiner* — S. Joseph Morano
*Assistant Examiner* — R. J. McCarry, Jr.
(74) *Attorney, Agent, or Firm* — Lowe Hauptman Ham & Berner LLP (57) ABSTRACT

In a current collecting contact member 7 that is arranged on the side surface of a vehicle 1 so as to face a train wire 35 laid near a track 30 of the vehicle 1, and is configured so as to collect electric power from the train wire 35 by means of sliding contact with the train wire 35, a groove 10 extending upward from a lower end part 8d of the contact member body 8 is formed in a contact-side surface 8a of a contact member body 8.

2 Claims, 6 Drawing Sheets

CURRENT COLLECTING CONTACT MEMBER

CROSS REFERENCE TO RELATED APPLICATION

The present application is based on, and claims priority from, Japanese Application No. 2008-035833, filed Feb. 18, 2008, the disclosure of which is hereby incorporated herein in its entirety.

BACKGROUND OF THE INVENTION AND RELATED ART STATEMENT

1. Field of the Invention

The present invention relates to a rubber-tired vehicle running on a dedicated track. More particularly, it relates to a current collecting contact member configured so as to collect electric power by means of sliding contact with a train wire laid near the vehicle track.

2. Description of Related Art

Conventionally, a traffic system for running rubber-tired vehicles on a dedicated track has been put into practical use to reduce traffic jams, accidents, and traffic pollution such as noise and exhaust gas.

The vehicle of such a traffic system is supported by four rubber tires and is configured to run on a dedicated track. Three current collecting contact members (collector shoes) are attached to the side surface of the vehicle so as to face three train wires laid near the vehicle track. The vehicle is configured so as to collect electric power from the train wires by bringing the current collecting contact members into sliding contact with the three train wires (For example, refer to Japanese Examined Utility Model Application Publication No. 3-14883).

Figure 9:
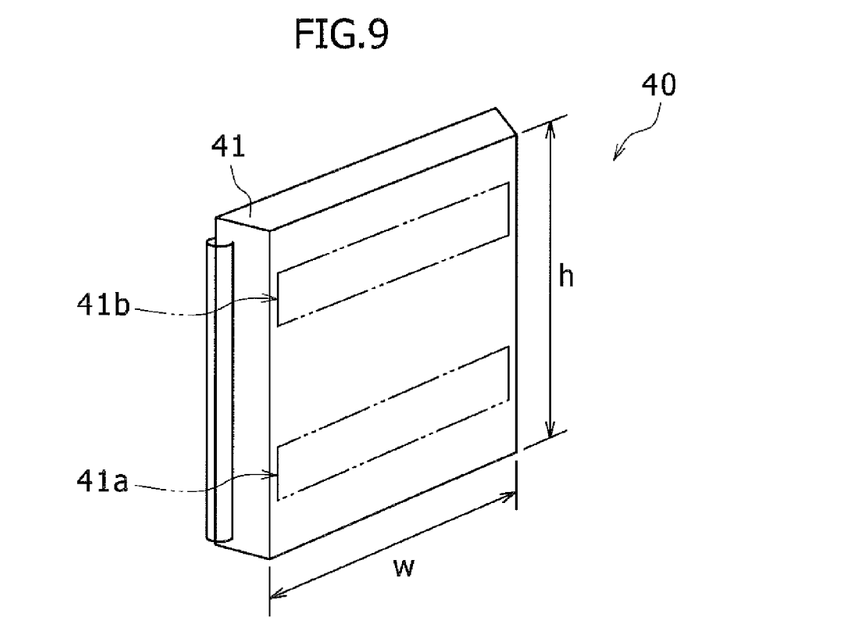
FIG. 9 is a perspective view of a conventional current collecting contact member.

FIG. 9 shows one example of a conventional current collecting contact member. A current collecting contact member 40 consists of a contact member body 41 formed by carbon and copper, and is formed so that the width w and the height h thereof are 100 mm each. The contact member body 41 has a lower contact surface 41a and an upper contact surface 41b, which come into contact with the train wire (not shown). When the current collecting contact member 40 is attached to a vehicle (not shown), the current collecting contact member 40 is first arranged so that the lower contact surface 41a faces to the train wire. Since the current collecting contact member 40 comes into sliding contact with the train wire, when operating the vehicle for a long time, the lower contact surface 41a of the current collecting contact member 40 is worn out. When the lower contact surface 41a thereof is worn out to a predetermined depth (for example, 5 mm), the current collecting contact member 40 is turned upside down to cause the upper contact surface 41b to face the train wire. Thereby, one current collecting contact member 40 can be used twice. When the upper contact surface 41b is worn out to the predetermined depth, the current collecting contact member 40 is removed from the vehicle, and is replaced with a new one.

Usually, the above-described current collecting contact member is not worn out rapidly. However, if rainwater enters onto the contact surface contacting with the train wire during rainy weather, the current collecting contact member may be worn out rapidly. If the contact surface contacting with the train wire of the current collecting contact member is worn out rapidly in this manner, the current collecting contact member must be replaced in a period shorter than usual. As a result, there arises a problem of a shortened service life of the current collecting contact member. Moreover, during rainy weather, since the contact surface contacting with the train wire reaches its wear limit and must be replaced during business operation, the business operation may be disrupted.

OBJECT AND SUMMARY OF THE INVENTION

The present invention has been made in view of the above circumstances, and accordingly an object thereof is to provide a current collecting contact member capable of preventing a contact surface contacting with a train wire from being worn out rapidly during rainy weather.

To solve the problems with the related art, the present invention provides a current collecting contact member that is arranged on the side surface of a vehicle so as to face a train wire laid near a track of the vehicle, and is configured so as to collect electric power from the train wire by means of sliding contact with the train wire, wherein a groove extending upward from a lower end part of the contact member body is formed in a contact-side surface of a contact member body.

In the present invention, the groove is inclined so that the lower end of the groove is positioned on the rear side of the upper end of the groove with respect to the travel direction of a vehicle.

Also, in the present invention, the groove is formed so that the upper end of the groove is positioned on a contact surface that comes into sliding contact with the train wire or under the contact surface.

Also, in the present invention, a plurality of grooves are formed in the contact-side surface of the contact member body, and at least two grooves of the plurality of grooves are formed so that they are inclined with respect to the travel direction, and the inclination directions are opposite to each other.

The present invention provides a current collecting contact member that is arranged on the side surface of a vehicle so as to face a train wire laid near a track of the vehicle; is configured so as to collect electric power from the train wire by means of sliding contact with the train wire; has a lower contact surface and an upper contact surface, which come into sliding contact with the train wire; and is configured so that after the lower contact surface has been worn out, the upper contact surface is used by turning the current collecting contact member upside down (turning through 180 degrees on the same plane), wherein a groove extending upward from a lower end part of the contact member body is formed in a contact-side surface of a contact member body, and also a groove extending downward from an upper end part of the contact member body is formed in the contact-side surface of the contact member body.

In the present invention, the groove extending from the lower end part is inclined so that the lower end of the groove is positioned at the rear side of the upper end of the groove with respect to the travel direction, and the groove extending from the upper end part is inclined so that the lower end of the groove is positioned on the rear side of the upper end of the groove with respect to the travel direction.

Also, in the present invention, the groove extending from the lower end part is formed so that the upper end of the groove is positioned on the lower contact surface that comes into sliding contact with the train wire or under the lower contact surface, and the groove extending from the upper end part is formed so that the lower end of the groove is positioned on the upper contact surface that comes into sliding contact with the train wire or over the upper contact surface.

Also, in the present invention, a plurality of grooves extending from the lower end part are formed in the contact-side surface of the contact member body and a plurality of grooves extending from the upper end part are formed in the contact-side surface of the contact member body; at least two grooves of the plurality of grooves extending from the lower end part are formed so that the grooves are inclined with respect to the travel direction and the inclination directions are opposite to each other; and at least two grooves of the plurality of grooves extending from the upper end part are formed so that the grooves are inclined with respect to the travel direction and the inclination directions are opposite to each other.

According to a first aspect of the present invention, during rainy weather, rainwater adhering to the contact member body is guided to the lower end part of the contact member body by the groove. Therefore, rainwater rarely enters in between the train wire and the contact surface of the contact member body, so that the contact surface of the contact member body can be prevented from being worn rapidly. Thereby, the service life of current collecting contact member can be prolonged as compared with the conventional example. Also, the contact surface of the contact member body is not worn out rapidly, and the day on which the contact surface of the contact member body reaches the wear limit can be predicted easily, so that the current collecting contact member can be replaced in a planned way.

According to a second aspect of the present invention, during rainy weather, rainwater flowing in the direction opposite to the travel direction is easily guided to the groove when the vehicle is running. Therefore, during rainy weather, rainwater more rarely enters in between the train wire and the contact surface of the contact member body, so that the contact surface of the contact member body can be prevented effectively from being worn out rapidly.

According to a third aspect of the present invention, when the contact surface that comes into sliding contact with the train wire is worn out into a concave shape, rainwater entering onto this contact surface can be guided to the lower end part of the contact member body by the groove. Therefore, rainwater rarely enters in between the train wire and the contact surface of the contact member body, so that the contact surface of the contact member body can be prevented from being worn out rapidly.

According to a fourth aspect of the present invention, for the vehicle that is run back and forth in a certain section (the vehicle having two travel directions A and B), even when the vehicle runs in either travel direction, rainwater flowing in the direction opposite to the travel direction is easily guided to the groove. For example, in the case where the travel direction of the vehicle is A, the groove inclined toward the travel direction A guides rainwater flowing in the direction opposite to the travel direction A to the lower end part of the contact member body, and in the case where the travel direction of the vehicle is B, the groove inclined toward the travel direction B guides rainwater flowing in the direction opposite to the travel direction B to the lower end part of the contact member body. Therefore, rainwater rarely enters in between the train wire and the contact surface of the contact member body, so that the contact surface of the contact member body can be prevented from being worn out rapidly.

According to a fifth aspect of the present invention, during rainy weather, rainwater adhering to the contact member body is guided to the lower end part of the contact member body by the groove. In addition, even when the upper contact surface is used by turning the current collecting contact member upside down after the lower contact surface has been worn out, during rainy weather, rainwater adhering to the contact member body is guided to the lower end part (the upper end part before turning) of the contact member body by the groove. Therefore, even when either of the lower contact surface and the upper contact surface is used, rainwater rarely enters in between the train wire and the contact surface of the contact member body, so that the contact surface of the contact member body can be prevented from being worn out rapidly. Also, the lower contact surface and the upper contact surface are not worn out rapidly. Therefore, the day on which each contact surface of the contact member body reaches the wear limit can be predicted easily, so that the current collecting contact member can be replaced in a planned way.

According to a sixth aspect of the present invention, rainwater flowing in the direction opposite to the travel direction is easily guided to the groove when the vehicle is running. In addition, even when the upper contact surface is used by turning the current collecting contact member upside down after the lower contact surface has been worn out, rainwater flowing in the direction opposite to the travel direction is easily guided to the groove when the vehicle is running. Therefore, even when either of the lower contact surface and the upper contact surface is used, rainwater more rarely enters in between the train wire and each contact surface of the contact member body, so that each contact surface of the contact member body can be prevented effectively from being worn out rapidly.

According to a seventh aspect of the present invention, when the lower contact surface that comes into sliding contact with the train wire is worn out into a concave shape, rainwater entering onto this lower contact surface can be guided to the lower end part of the contact member body by the groove. In addition, even when the upper contact surface is used by turning the current collecting contact member upside down after the lower contact surface has been worn out, in the case where the upper contact surface that comes into sliding contact with the train wire is worn out into a concave shape, rainwater entering onto this upper contact surface can be guided to the lower end part of the contact member body by the groove. Therefore, even when either of the lower contact surface and the upper contact surface is used, rainwater rarely enters in between the train wire and each contact surface of the contact member body, so that each contact surface of the contact member body can be prevented from being worn out rapidly.

According to an eighth aspect of the present invention, for the vehicle that is run back and forth in a certain section (the vehicle having two travel directions A and B), even when the vehicle runs in either travel direction, rainwater flowing in the direction opposite to the travel direction is easily guided to the groove. For example, in the case where the travel direction of the vehicle is A, the groove inclined toward the travel direction A guides rainwater flowing in the direction opposite to the travel direction A to the lower end part of the contact member body, and in the case where the travel direction of the vehicle is B, the groove inclined toward the travel direction B guides rainwater flowing in the direction opposite to the travel direction B to the lower end part of the contact member body. In addition, even when the upper contact surface is used by turning the current collecting contact member upside down after the lower contact surface has been worn out, rainwater flowing in the direction opposite to the travel direction is easily guided to the groove even when the vehicle runs in either travel direction. Therefore, even when the vehicle runs in either travel direction, rainwater rarely enters in between the train wire and the contact surface of the contact member body, so that the contact surface of the contact member body can be prevented from being worn out rapidly.

DETAILED DESCRIPTION OF PREFERRED EMBODIMENTS

Figure 1:
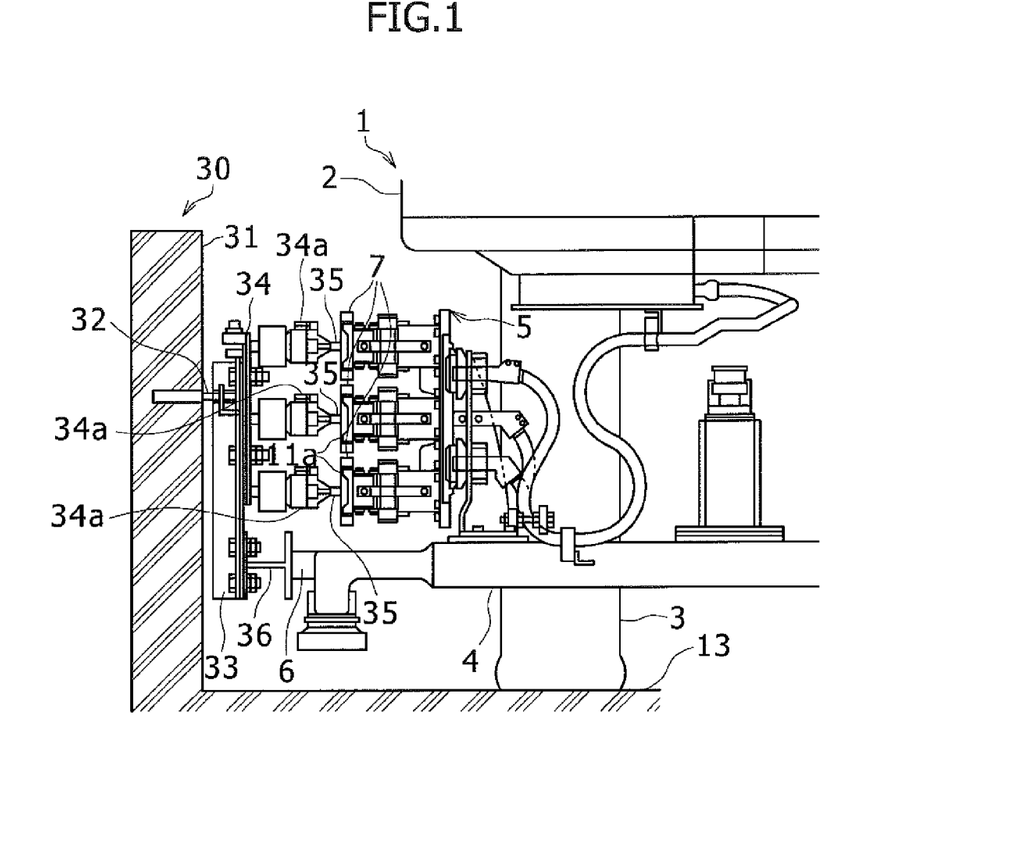
FIG. 1 is a sectional view of the lower part of a rubber-tired vehicle in accordance with an embodiment of the present invention.
Figure 2:
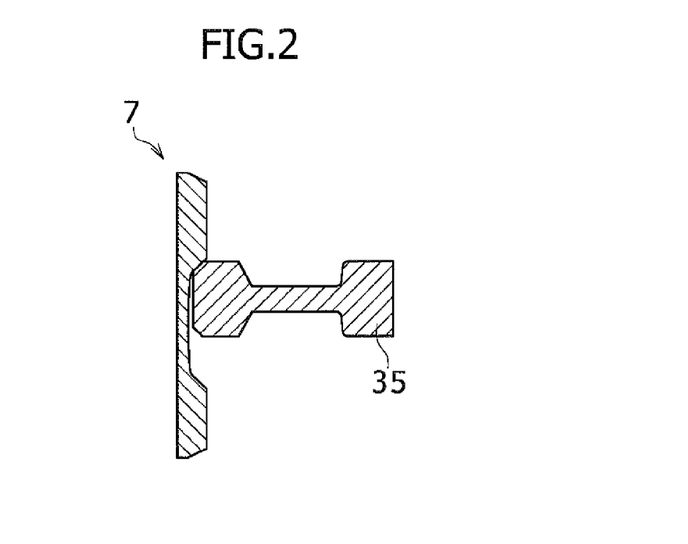
FIG. 2 is a sectional view showing a state in which a current collecting contact member in accordance with an embodiment of the present invention is in contact with a train wire.

Current collecting contact members in accordance with embodiments of the present invention will now be described with reference to the accompanying drawings. FIG. 1 is a sectional view of the lower part of a rubber-tired vehicle in accordance with an embodiment of the present invention. FIG. 2 is a sectional view showing a state in which a current collecting contact member in accordance with an embodiment of the present invention is in contact with a train wire.

As shown in FIG. 1, a vehicle 1 in accordance with an embodiment of the present invention is supported by four rubber tires 3 and runs on a dedicated track 30.

A side wall or a pillar 31 is provided with an anchor bolt 32 projecting from the side wall or the pillar 31. An insulator attachment plate 34 is attached to the anchor bolt 32 via a support plate 33. Three insulators 34a are arranged on the insulator attachment 34 in the up and down direction, and a train wire 35 extending toward the inside of the track 30 is provided in the tip end part of each of the insulators 34a. Also, a guide rail 36 formed of an H-section steel is provided in the side wall or the pillar 31 of the track 30. The guide rail 36 is attached via the support plate 33 in the lower part of the insulator attachment plate 34.

On the other hand, the vehicle body 2 is provided with a steering guide device 4 projecting in the vehicle width direction, and the guide device 4 is provided with a collector 5 and a guide wheel 6. Three current collecting contact members 7 are attached to the collector 5 in the up and down direction of the vehicle. Each of the current collecting contact members 7 is arranged at a position facing to the train wire 35. As shown in FIGS. 1 and 2, the vehicle 1 runs on the track 30 while the guide wheel 6 of the guide device 4 is brought into contact with the side surface of the guide rail 36, and the vehicle is configured so as to collect electric power from the train wires 35 by bringing the three current collecting contact members 7 into sliding contact with the three train wires 35.

The vehicle 1 of this embodiment is configured so that the three current collecting contact members 7 are used for the three train wires 35 to collect ac electric power. In the case where dc electric power is collected, two current collecting contact members 7 are used for two train wires 35.

Figure 3:
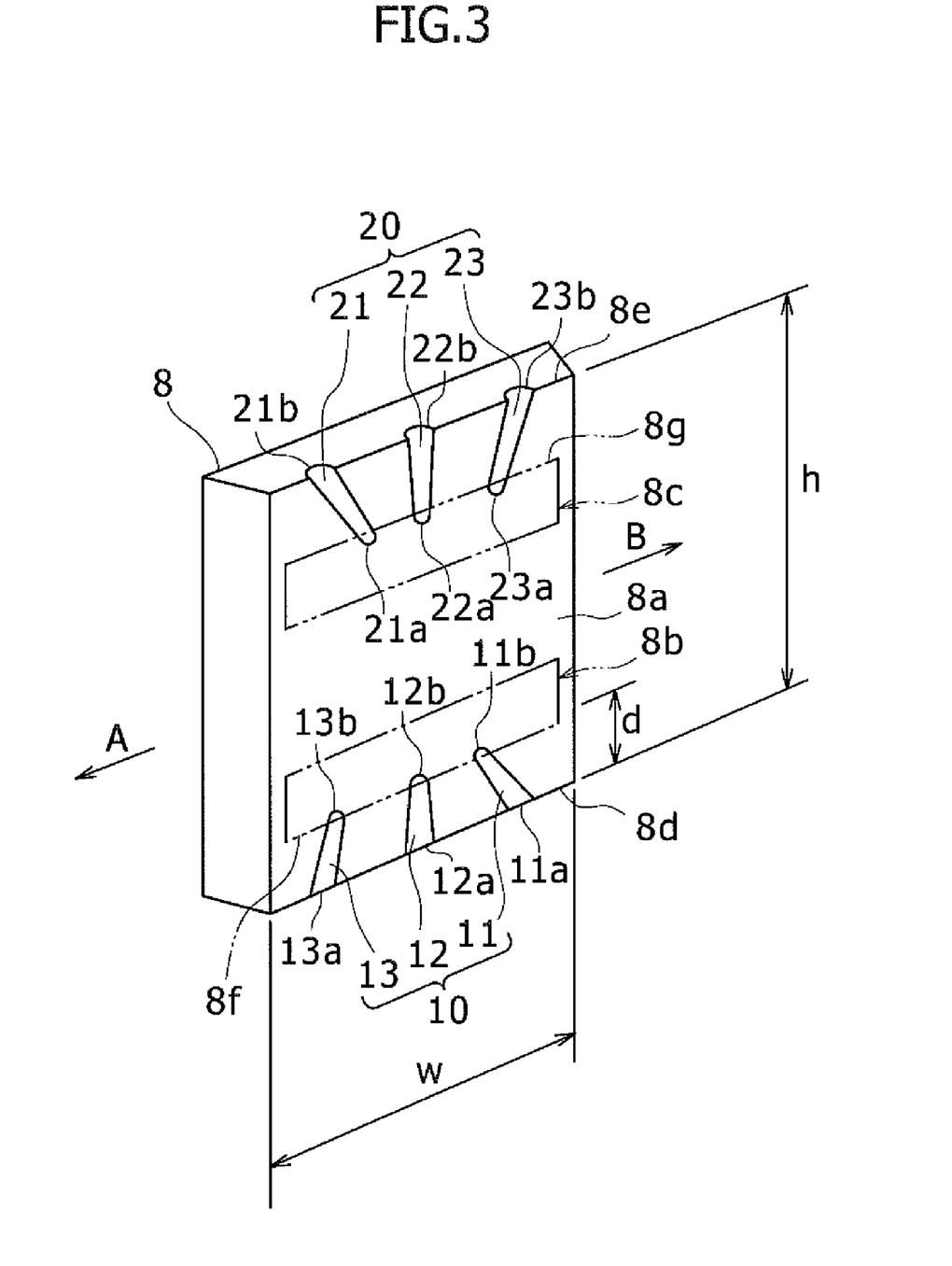
FIG. 3 is a perspective view of a current collecting contact member in accordance with a first embodiment of the present invention.

Next, a current collecting contact member in accordance with a first embodiment of the present invention is explained with reference to FIG. 3. FIG. 3 is a perspective view of the current collecting contact member 7 in accordance with a first embodiment of the present invention.

This embodiment is applied to the vehicle 1 that runs back and forth on the dedicated track 30. In the state in which the current collecting contact member 7 is attached to the collector 5 of the vehicle body 2, the directions indicated by arrows A and B are the travel directions of the vehicle.

The current collecting contact member 7 consists of a contact member body 8 formed of carbon and copper, and is formed so that the width w and the height h thereof is 100 mm each. The contact member body 8 has a lower contact surface 8b and an upper contact surface 8c, which come into contact with the train wire 35, on a contact-side surface 8a. When the current collecting contact member 7 is attached to the collector 5, the current collecting contact member 7 is first arranged so that the lower contact surface 8b faces to the train wire 35. When the lower contact surface 8b is worn out to a predetermined depth, the current collecting contact member 7 is turned upside down (turned through 180 degrees on the contact-side surface 8b) to cause the upper contact surface 8c to face the train wire 35. Thereby, one current collecting contact member 7 can be used twice.

For the current collecting contact member 7 in accordance with the first embodiment of the present invention, three grooves 10 (11, 12, 13) are formed on the contact-side surface 8a that comes into contact with the train wire 35 of the contact member body 8. The grooves 10 extend upward from a lower end part 8d of the contact member body 8. In addition, three grooves 20 (21, 22, 23) are formed on the contact-side surface 8a that comes into contact with the train wire 35 of the contact member body 8. The grooves 20 extend downward from an upper end part 8e of the contact member body 8. These grooves 10 and 20 are formed into a V shape in cross section by using a grinding machine.

The groove 11 extending from the lower end part 8d of the contact member body 8 is inclined so that a lower end 11a of the groove 11 is positioned on the rear side of an upper end 11b of the groove 11 with respect to the travel direction A, and is arranged on the rear side of the groove 12 with respect to the travel direction A.

Also, the groove 12 extending from the lower end part 8d of the contact member body 8 extends from a middle part of the lower end part 8d of the contact member body 8 in the vertical direction with respect to the lower end part 8d.

The groove 13 extending from the lower end part 8d of the contact member body 8 is inclined so that a lower end 13a of the groove 13 is positioned on the rear side of an upper end 13b of the groove 13 with respect to the travel direction B, and is arranged on the rear side of the groove 12 with respect to the travel direction B.

On the other hand, the groove 21 extending from an upper end part 8e of the contact member body 8 is inclined so that a lower end 21a of the groove 21 is positioned on the rear side of an upper end 21b of the groove 21 with respect to the travel direction A, and is arranged on the front side of the groove 22 with respect to the travel direction A. That is to say, when the current collecting contact member 7 is turned upside down, the groove 21 is inclined so that the lower end (the upper end 21*b* before turning) of the groove 21 is positioned on the rear side of the upper end (the lower end 21*a* before turning) of the groove 21 with respect to the travel direction A, and is arranged on the rear side of the groove 22 with respect to the travel direction A.

Also, the groove 22 extending from the upper end part 8*e* of the contact member body 8 extends from a middle part of the upper end part 8*e* of the contact member body 8 in the vertical direction with respect to the upper end part 8*e*.

The groove 23 extending from the upper end part 8*e* of the contact member body 8 is inclined so that a lower end 23*a* of the groove 23 is positioned on the rear side of an upper end 23*b* of the groove 23 with respect to the travel direction B, and is arranged on the front side of the groove 22 with respect to the travel direction B. That is to say, when the current collecting contact member 7 is turned upside down, the groove 23 is inclined so that the lower end (the upper end 23*b* before turning) of the groove 23 is positioned on the rear side of the upper end (the lower end 23*a* before turning) of the groove 23 with respect to the travel direction B, and is arranged on the rear side of the groove 22 with respect to the travel direction B.

The three grooves 11, 12 and 13 extending from the lower end part 8*d* of the contact member body 8 are formed so that the upper ends 11*b*, 12*b* and 13*b* thereof are positioned at a lower end 8*f* of the lower contact surface 8*b* that comes into sliding contact with the train wire 35. Also, the three grooves 21, 22 and 23 extending from the upper end part 8*e* of the contact member body 8 are formed so that the lower ends 21*a*, 22*a* and 23*a* thereof are positioned at an upper end 8*g* of the upper contact surface 8*c* that comes into sliding contact with the train wire 35.

During the operation of the vehicle 1, the contact surfaces 8*b* and 8*c*, which come into contact with the train wire 35, may move up or down depending on the situation of, for example, the pneumatic pressure of the rubber tire 3 of the vehicle 1. Therefore, when the grooves 10 and 20 are formed in the contact member body 8, for example, in the case of the three grooves 10 extending from the lower end part 8*d* of the contact member body 8, the grooves 10 may be formed so that the height d from the lower end to the upper end of each of the three grooves 10 is 15 to 30% of the height h of the contact member body 8 considering the up and down movement of the contact surfaces 8*b* and 8*c*.

Next, experimental results in which the change in wearing state of the current collecting contact member in accordance with the first embodiment are compared with those of a conventional current collecting contact member is explained with reference to FIGS. 4 and 5.

Figure 4A:
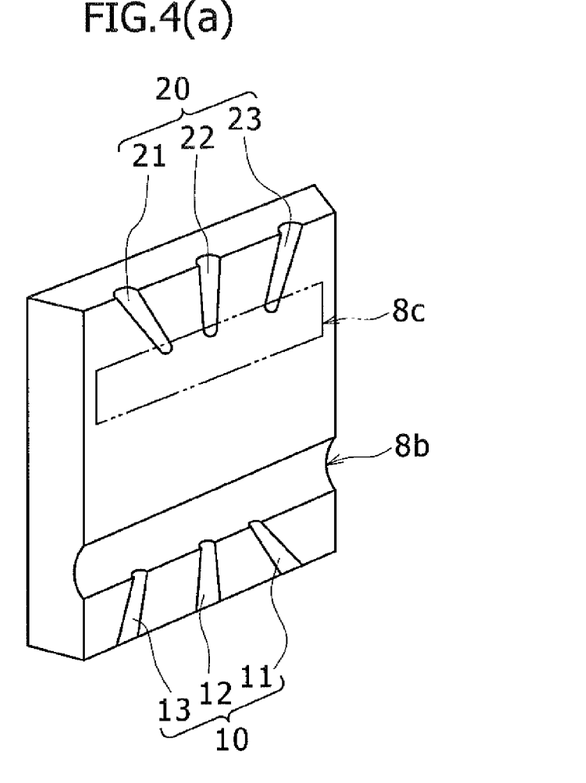
FIG. 4(a) is a perspective view of a current collecting contact member in accordance with a first embodiment of the present invention, which was used in an experiment.
Figure 4B:
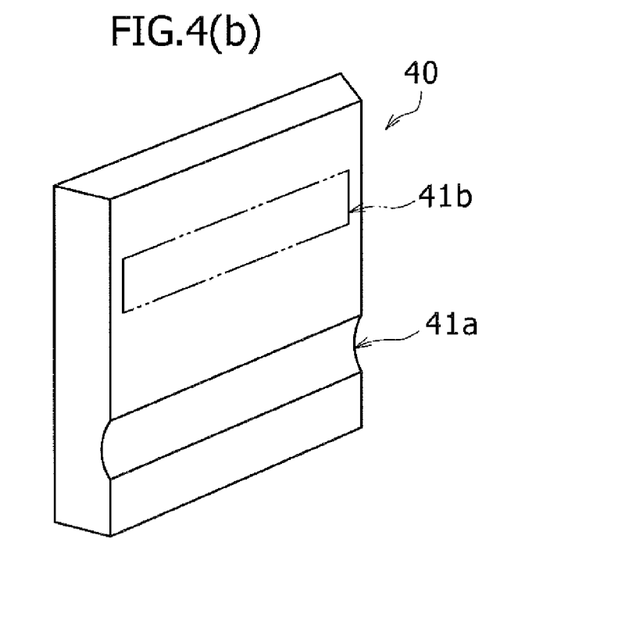
FIG. 4(b) is a perspective view of a conventional current collecting contact member which was used in the experiment.

FIG. 4(*a*) shows the current collecting contact member 7 in accordance with the first embodiment, which was used in the experiment. FIG. 4(*b*) shows a conventional current collecting contact member 40 that was used in the experiment.

The aim of this experiment was to examine an effect at the time when rainwater entering onto the lower contact surface 8*b* of the current collecting contact member 7 in accordance with the first embodiment is drained downward through the three grooves 10. The experiment was started from a state in which rainwater easily enters onto the lower contact surfaces 8*b*, 41*a* of the current collecting contact members 7, 40. As shown in FIG. 4, the experiment was started from a state in which the lower contact surfaces 8*b* and 41*a* of both of the current collecting contact member 7 in accordance with the first embodiment and the conventional current collecting contact member 40 have been worn out by about 2 mm. Also, in this experiment, the current collecting contact member 7 in accordance with the first embodiment and the conventional current collecting contact member 40 were attached to the same side surface of the vehicle body 2 of the vehicle 1.

Figure 5:
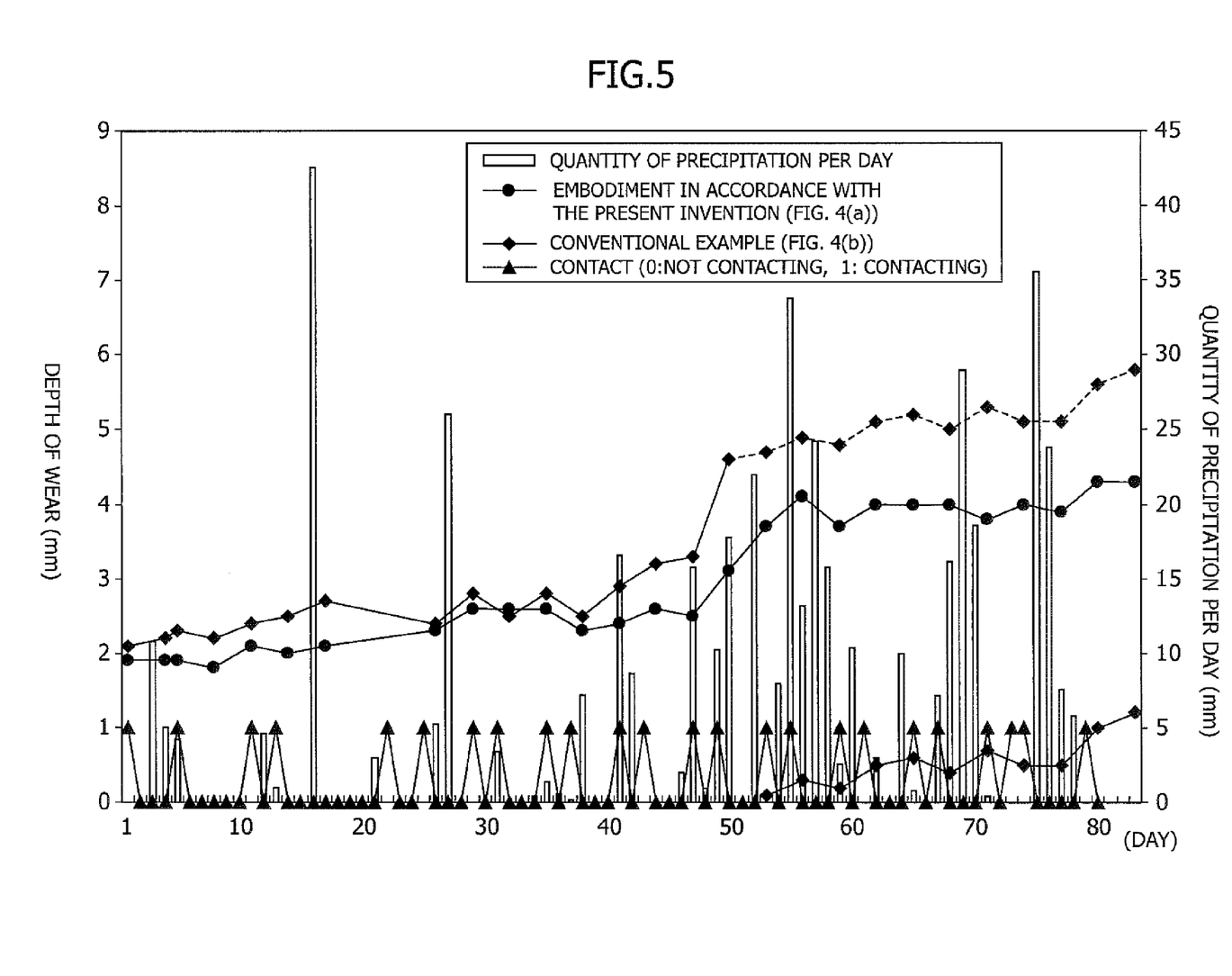
FIG. 5 is a graph showing an experimental result in which the change in wearing state of a current collecting contact member in accordance with a first embodiment of the present invention is compared with that of a conventional current collecting contact member.

FIG. 5 shows the relationship between the quantity of precipitation per day and the depth of wear of each of the current collecting contact members. In this experiment, the change in the depth of wear of the current collecting contact members 7, 40 was measured for about 80 days. Since the vehicle 1 runs along various routes, the current collecting contact members 7, 40 attached to one-side side surface of the vehicle body 2 do not always come into contact with the train wire 35. Therefore, in FIG. 5, the days on which the current collecting contact members 7, 40 come into contact with the train wire 35 are also shown by a zigzag line. Regarding the zigzag line, 1 denotes that the current collecting contact members 7, 40 came into contact with the train wire 35, and 0 denotes that the current collecting contact members 7, 40 did not come into contact with the train wire 35.

Also, in FIG. 5, the depth of wear of the conventional current collecting contact member 40 is shown by a rhomb-marked broken line. In FIG. 5, the broken line on the fifty-third day and after is located in the lower part of the graph, and this indicates that the depth of wear of the lower contact surface 41*a* reached 5 mm, being the wear limit, on the fifty-second day and thereafter the current collecting contact member 40 was turned upside down and the upper contact surface 41*b* was used. The broken line of a rhomb-marked dashed line is the line that is drawn by shifting the broken line indicating the depth of wear of the upper contact surface 41*b*, which is located in the lower part of the graph, upward in parallel. Thereby, the rhomb-marked dashed line indicates the total depth of wear of the conventional current collecting contact member 40 from the start of the experiment.

As shown in FIG. 5, on the sixteenth day (the quantity of precipitation per day was about 42 mm) and the twenty-seventh day (the quantity of precipitation per day was about 25 mm), the quantity of precipitation per day was large, but the current collecting contact members 7, 40 were not in contact with the train wire 35. Therefore, none of the contact surfaces that came into contact with the train wire 35 was worn out rapidly.

On the other hand, for example, on the fourth-seventh day, the quantity of precipitation per day was about 15 mm, and the current collecting contact members 7, 40 were in contact with the train wire 35. It is found that on that day, the conventional current collecting contact member 40 was worn out more rapidly than the current collecting contact member 7 in accordance with the first embodiment, and in contrast, the current collecting contact member 7 in accordance with the first embodiment was scarcely worn out as compared with the conventional current collecting contact member 40.

As the result, for the conventional current collecting contact member 40, the depth of wear reached 5 mm, being the wear limit, on the fifty-second day, and thereafter the current collecting contact member 40 was turned upside down and the upper contact surface 41*b* was used. In contrast, for the current collecting contact member 7 in accordance with the first embodiment, the depth of wear did not reach 5 mm, being the wear limit, even after 80 days had elapsed.

By the above-described experiment, it was confirmed that for the conventional current collecting contact member 40, rainwater entering onto the lower contact surface 8*b* during rainy weather is drained by the three grooves 10, and the rainwater rarely enters in between the train wire 35 and the lower contact surface 8b, by which the lower contact surface 8b is prevented from being worn out rapidly.

As described above, according to the current collecting contact member 7 in accordance with the first embodiment, the three grooves 10 extending upward from the lower end part 8d of the contact member body 8 are formed in the contact-side surface 8a contacting with the train wire 35 of the contact member body 8, and also the three grooves 20 extending downward from the upper end part 8e of the contact member body 8 are formed in the contact-side surface 8a. Therefore, during rainy weather, rainwater adhering to the contact member body 8 is guided to the lower end part 8d of the contact member body 8 by the three grooves 10. In addition, even when the upper contact surface 8c is used by turning the current collecting contact member 7 upside down after the lower contact surface 8b has been worn out, during rainy weather, rainwater adhering to the contact member body 8 is guided to the lower end part (the upper end part 8e before turning) of the contact member body 8 by the three grooves 20. Therefore, even in the case where either of the lower contact surface 8b and the upper contact surface 8c is used, rainwater rarely enters in between the train wire 35 and the contact surface of the contact member body 8, so that the contact surface of the contact member body 8 can be prevented from being worn out rapidly.

Also, since only three grooves are formed from each of the lower end part 8d and the upper end part 8e of the contact member body 8, the contact area that comes into contact with the train wire 35 can be secured sufficiently, and the rigidity of the current collecting contact member 7 can also be secured.

According to the current collecting contact member 7 in accordance with the first embodiment, the groove 11 extending from the lower end part 8d of the contact member body 8 is inclined so that the lower end 11a of the groove 11 is positioned on the rear side of the upper end 11b of the groove 11 with respect to the travel direction A. Thereby, during rainy weather, rainwater flowing in the direction opposite to the travel direction A is easily guided to the groove 11 when the vehicle 1 is running. Also, the groove 13 extending from the lower end part 8d of the contact member body 8 is inclined so that the lower end 13a of the groove 13 is positioned on the rear side of the upper end 13b of the groove 13 with respect to the travel direction B. Thereby, rainwater flowing in the direction opposite to the travel direction B is easily guided to the groove 13 when the vehicle 1 is running. In addition, the groove 12 extending from the lower end part 8d of the contact member body 8 extends from the middle part of the lower end part 8d of the contact member body 8 in the vertical direction with respect to the lower end part 8d. Thereby, when the vehicle 1 is stopping, rainwater can be drained by the groove 12.

On the other hand, the groove 21 extending from the upper end part 8e of the contact member body 8 is inclined so that the lower end 21a of the groove 21 is positioned on the rear side the an upper end 21b of the groove 21 with respect to the travel direction A. Thereby, even when the upper contact surface 8c is used by turning the current collecting contact member 7 upside down after the lower contact surface 8b has been worn out, during rainy weather, rainwater flowing in the direction opposite to the travel direction A is easily guided to the groove 21 when the vehicle 1 is running. Also, the groove 23 extending from the upper end part 8e of the contact member body 8 is inclined so that the lower end 23a of the groove 23 is positioned on the rear side of the upper end 23b of the groove 23 with respect to the travel direction B. Thereby, even when the upper contact surface 8c is used by turning the current collecting contact member 7 upside down after the lower contact surface 8b has been worn out, during rainy weather, rainwater flowing in the direction opposite to the travel direction B is easily guided to the groove 23 when the vehicle 1 is running. In addition, the groove 22 extending from the upper end part 8e of the contact member body 8 extends from the middle part of the upper end part 8e of the contact member body 8 in the vertical direction with respect to the upper end part 8e. Thereby, even when the upper contact surface 8c is used by turning the current collecting contact member 7 upside down after the lower contact surface 8b has been worn out, when the vehicle 1 is stopping, rainwater can be drained by the groove 22.

Thus, for the vehicle 1 running back and forth on the track 30, by inclining at least one groove of the grooves 10 and 20 formed in the contact-side surface 8a contacting with the train wire 35 of the contact member body 8 with respect to the travel directions A and B, rainwater can be guided downward more effectively.

Also, according to the current collecting contact member 7 in accordance with the first embodiment, the three grooves 11, 12 and 13 extending from the lower end part 8d of the contact member body 8 are formed so that the upper ends 11b, 12b and 13b thereof are positioned at the lower end 8f of the lower contact surface 8b that comes into sliding contact with the train wire 35, and the three grooves 21, 22 and 23 extending from the upper end part 8e of the contact member body 8 are formed so that the lower ends 21b, 22b and 23b thereof are positioned at the upper end 8g of the upper contact surface 8c that comes into sliding contact with the train wire 35. Therefore, when the lower contact surface 8b that comes into sliding contact with the train wire 35 is worn out into a concave shape, rainwater entering onto the lower contact surface 8b can be guided to the lower end part 8d of the contact member body 8 by the three grooves 11, 12 and 13. In addition, even when the upper contact surface 8c is used by turning the current collecting contact member 7 upside down after the lower contact surface 8b has been worn out, in the case where the upper contact surface 8c that comes into sliding contact with the train wire 35 is worn out into a concave shape, rainwater entering onto the upper contact surface 8c can be guided to the lower end part (the upper end part 8e before turning) of the contact member body 8 by the three grooves 21, 22 and 23. Therefore, rainwater does not enter in between the train wire 35 and the contact surface 8b, 8c of the contact member body 8, so that the contact surfaces 8b and 8c of the contact member body 8 can be prevented from being worn out rapidly.

Figure 6:
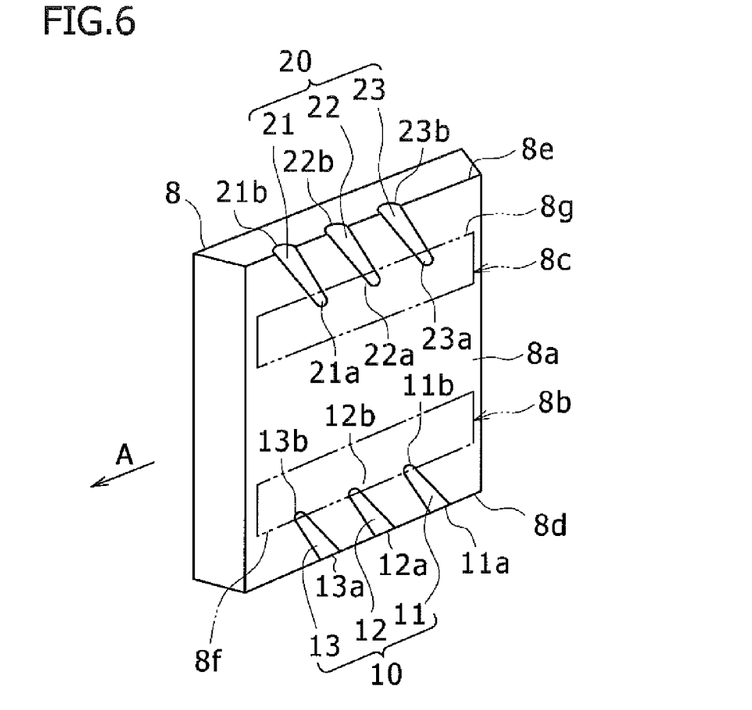
FIG. 6 is a perspective view of a current collecting contact member in accordance with a second embodiment of the present invention.

Next, a current collecting contact member in accordance with a second embodiment of the present invention is explained with reference to FIG. 6. FIG. 6 is a perspective view of the current collecting contact member in accordance with the second embodiment of the present invention.

In this embodiment, the same reference numbers are applied to elements that are the same as those explained in the above-described first embodiment, and duplicated explanation thereof is omitted.

This embodiment is applied to the vehicle 1 (refer to FIGS. 1 and 2) that runs in one direction on the dedicated track 30. In the state in which the current collecting contact member 7 is attached to the collector 5 of the vehicle body 2, the direction indicated by arrow A is the travel direction of the vehicle.

As shown in FIG. 6, three grooves 10 (11, 12, 13) extending upward from the lower end part 8d of the contact member body 8 are formed in the contact-side surface 8a contacting with the train wire 35 of the contact member body 8, and also three grooves 20 (21, 22, 23) extending downward from the upper end part 8e of the contact member body 8 are formed in the contact-side surface 8a.

The three grooves 11, 12 and 13 extending from the lower end part 8d of the contact member body 8 are inclined so that the lower ends 11a, 12a and 13a thereof are positioned on the rear side of the upper ends 11b, 12b and 13b thereof with respect to the travel direction A. On the other hand, the three grooves 21, 22 and 23 extending from the upper end part 8e of the contact member body 8 are inclined so that the lower ends 21a, 22a and 23a thereof are positioned on the rear side of the upper ends 21b, 22b and 23b thereof with respect to the travel direction A.

Also, the three grooves 11, 12 and 13 extending from the lower end part 8d of the contact member body 8 are formed so that the upper ends 11b, 12b and 13b thereof are positioned at the lower end 8f of the lower contact surface 8b that comes into sliding contact with the train wire 35. Also, the three grooves 21, 22 and 23 extending from the upper end part 8e of the contact member body 8 are formed so that the lower ends 21a, 22a and 23a thereof are positioned at the upper end 8g of the upper contact surface 8c that comes into sliding contact with the train wire 35.

As described above, according to the current collecting contact member 7 in accordance with the second embodiment, the three grooves 11, 12 and 13 extending from the lower end part 8d of the contact member body 8 are inclined so that the lower ends 11a, 12a and 13a thereof are positioned on the rear side of the upper ends 11b, 12b and 13b thereof with respect to the travel direction A, and on the other hand, the three grooves 21, 22 and 23 extending from the upper end part 8e of the contact member body 8 are inclined so that the lower ends 21a, 22a and 23a thereof are positioned on the rear side of the upper ends 21b, 22b and 23b thereof with respect to the travel direction A. Therefore, when the vehicle 1 runs toward the travel direction A during rainy weather, rainwater flowing in the direction opposite to the travel direction A is easily guided to the inclined three grooves 11, 12 and 13 when the vehicle 1 is running. Also, even when the upper contact surface 8c is used by turning the current collecting contact member 7 upside down after the lower contact surface 8b has been worn out, in the case where the vehicle 1 runs toward the travel direction A during rainy weather, rainwater flowing in the direction opposite to the travel direction A is easily guided to the inclined three grooves 21, 22 and 23 when the vehicle 1 is running.

Thus, for the vehicle 1 running in one direction on the track 30, by inclining all of the grooves 10 and 20 formed in the contact-side surface 8a contacting with the train wire 35 of the contact member body 8 with respect to the travel direction A, rainwater can be guided downward more effectively.

Also, according to the current collecting contact member in accordance with the second embodiment, the three grooves 11, 12 and 13 extending from the lower end part 8d of the contact member body 8 are formed so that the upper ends 11b, 12b and 13b thereof are positioned at the lower end 8f of the lower contact surface 8b that comes into sliding contact with the train wire 35, and also the three grooves 21, 22 and 23 extending from the upper end part 8e of the contact member body 8 are formed so that the lower ends 21a, 22a and 23a thereof are positioned at the upper end 8g of the upper contact surface 8c that comes into sliding contact with the train wire 35. Therefore, when the lower contact surface 8b that comes into sliding contact with the train wire 35 is worn out into a concave shape, rainwater entering onto the lower contact surface 8b can be guided to the lower end part 8d of the contact member body 8 by the three grooves 11, 12 and 13. In addition, even when the upper contact surface 8c is used by turning the current collecting contact member 7 upside down after the lower contact surface 8b has been worn out, in the case where the upper contact surface 8c that comes into sliding contact with the train wire 35 is worn out into a concave shape, rainwater entering onto the upper contact surface 8c can be guided to the lower end part (the upper end part 8e before turning) of the contact member body 8 by the three grooves 21, 22 and 23. Therefore, rainwater does not enter in between the train wire 35 and each contact surface 8b, 8c of the contact member body 8, so that the contact surfaces 8b and 8c of the contact member body 8 can be prevented from being worn out rapidly.

Figure 7:
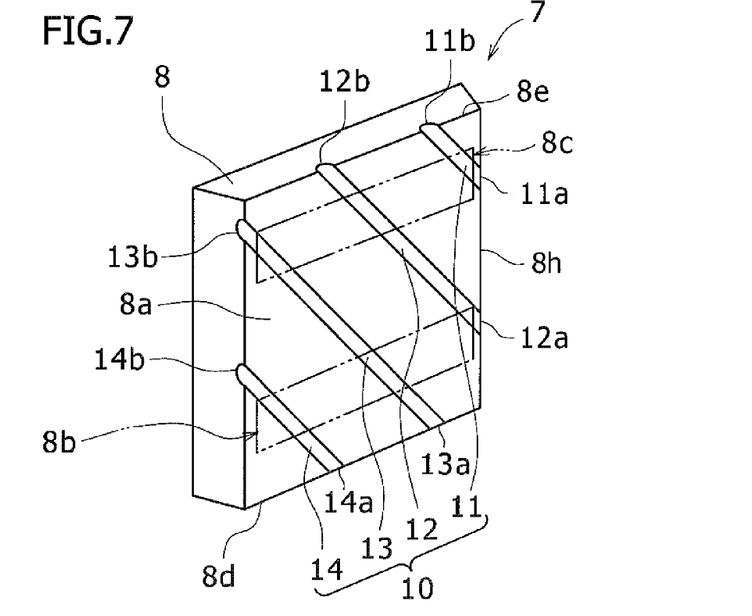
FIG. 7 is a perspective view of a current collecting contact member in accordance with a third embodiment of the present invention.

Next, a current collecting contact member in accordance with a third embodiment of the present invention is explained with reference to FIG. 7. FIG. 7 is a perspective view of the current collecting contact member in accordance with the third embodiment of the present invention.

In this embodiment, the same reference numbers are applied to elements that are the same as those explained in the above-described first embodiment, and duplicated explanation thereof is omitted.

This embodiment is applied to the vehicle 1 (refer to FIGS. 1 and 2) that runs in one direction on the dedicated track 30. In the state in which the current collecting contact member 7 is attached to the collector 5 of the vehicle body 2, the direction indicated by arrow A is the travel direction of the vehicle.

As shown in FIG. 7, four grooves 10 (11, 12, 13, 14) extending upward from the lower end part 8d or a side edge part 8h of the contact member body 8 are formed in the contact-side surface 8a contacting with the train wire 35 of the contact member body 8. These four grooves 11, 12, 13 and 14 are inclined so that lower ends 11a, 12a, 13a and 14a thereof are positioned on the rear side of upper ends 11b, 12b, 13b and 14b thereof with respect to the travel direction A.

As described above, according to the current collecting contact member 7 in accordance with the third embodiment, the four grooves 10 (11, 12, 13, 14) extending upward from the lower end part 8d or the side edge part 8h of the contact member body 8 are formed in the contact-side surface 8a contacting with the train wire 35 of the contact member body 8, and these four grooves 11, 12, 13 and 14 are inclined so that the lower ends 11a, 12a, 13a and 14a thereof are positioned on the rear side of the upper ends 11b, 12b, 13b and 14b thereof with respect to the travel direction A. Therefore, when the vehicle 1 runs toward the travel direction A during rainy weather, rainwater flowing in the direction opposite to the travel direction A is easily guided to the inclined grooves 13 and 14. Also, even when the upper contact surface 8c is used by turning the current collecting contact member 7 upside down after the lower contact surface 8b has been worn out, in the case where the vehicle 1 runs toward the travel direction A during rainy weather, rainwater flowing in the direction opposite to the travel direction A is easily guided to the inclined grooves 11, 12 and 13.

Thus, for the vehicle 1 running in one direction on the track 30, by inclining all of the four grooves 10 formed in the contact-side surface 8a contacting with the train wire 35 of the contact member body 8 with respect to the travel direction A, rainwater can be guided downward more effectively.

Also, when the lower contact surface 8b that comes into sliding contact with the train wire 35 is worn out into a concave shape, rainwater entering onto the lower contact surface 8b can be guided to the lower end part 8d of the contact member body 8 by the grooves 13 and 14. In addition, even when the upper contact surface 8c is used by turning the current collecting contact member 7 upside down after the lower contact surface 8b has been worn out, in the case where the upper contact surface 8c that comes into sliding contact with the train wire 35 is worn out into a concave shape, rainwater entering onto the upper contact surface 8c can be guided to the lower end part (the upper end part 8e before turning) of the contact member body 8 by the grooves 11, 12 and 13. Therefore, rainwater does not enter in between the train wire 35 and the contact surface 8b, 8c of the contact member body 8, so that the contact surfaces 8b and 8c of the contact member body 8 can be prevented from being worn out rapidly.

Figure 8:
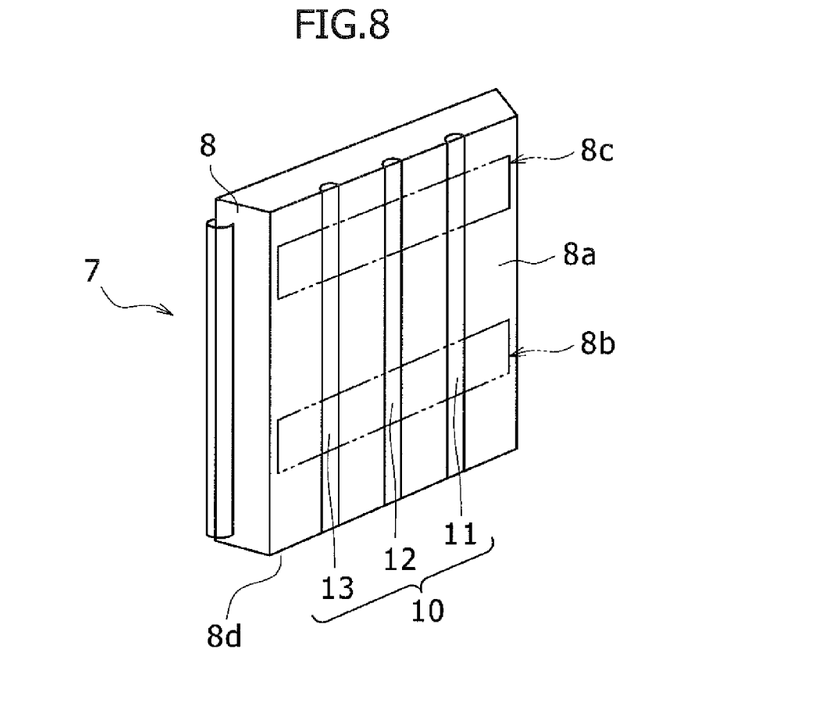
FIG. 8 is a perspective view of a current collecting contact member in accordance with a fourth embodiment of the present invention.

Next, a current collecting contact member in accordance with a fourth embodiment of the present invention is explained with reference to FIG. 8. FIG. 8 is a perspective view of the current collecting contact member in accordance with the fourth embodiment of the present invention.

In this embodiment, the same reference numbers are applied to elements that are the same as those explained in the above-described first embodiment, and duplicated explanation thereof is omitted.

Three grooves 10 (11, 12, 13) extending from the lower end part 8d of the contact member body 8 to the upper end part 8e thereof are formed in the contact-side surface 8a contacting with the train wire 35 of the contact member body 8. The three grooves 11, 12 and 13 extend in the vertical direction with respect to the lower end part 8d of the contact member body 8 at predetermined intervals.

As described above, according to the current collecting contact member 7 in accordance with the fourth embodiment, the three grooves 11, 12 and 13 extending from the lower end part 8d of the contact member body 8 to the upper end part 8e thereof are formed in the contact-side surface 8a contacting with the train wire 35 of the contact member body 8. Therefore, during rainy weather, rainwater adhering to the contact member body 8 is guided to the lower end part 8d of the contact member body 8 by the three grooves 11, 12 and 13. As a result, rainwater rarely enters in between the train wire 35 and the contact surface of the contact member body 8, so that the lower contact surface 8b of the contact member body 8 can be prevented from being worn out rapidly. In addition, even when the upper contact surface 8c is used by turning the current collecting contact member 7 upside down after the lower contact surface 8b has been worn out, during rainy weather, rainwater adhering to the contact member body 8 is guided to the lower end part (the upper end part 8e before turning) of the contact member body 8 by the three grooves 11, 12 and 13, so that rainwater rarely enters in between the train wire 35 and the upper contact surface 8c of the contact member body 8. Therefore, the contact surface 8b of the contact member body 8 can be prevented from being worn out rapidly.

In addition, since the configuration is a simple one such that the three grooves 11, 12 and 13 are formed so as to extend from the lower end part 8d of the contact member body 8 to the upper end part 8e thereof, work for forming grooves in the contact member body 8 is easy, so that the work cost involved in manufacturing the current collecting contact member 7 is also low.

The above is a description of the embodiments of the present invention. However, the present invention is not limited to the above-described embodiments, and various modifications and changes can be made based on the technical concept of the present invention.

In the above-described embodiments, each of the grooves formed in the current collecting contact member 7 is formed into a V shape in cross section by using a grinding machine. However, the shape of groove is not limited to this V shape.

For example, the cross-sectional shape of groove may be made a U shape or a rectangular shape.

In the above-described embodiments, the grooves 10, 20 are comprised of three or four grooves. However, the number of grooves is not limited to these numbers. The grooves 10, 20 may be comprised of two or less or five or more grooves.

The invention claimed is:

1. A current collecting contact member comprising:
a current collecting contact member body which is arranged on the side surface of a vehicle so as to face a train wire laid near a track of the vehicle, and is configured so as to collect electric power from the train wire by means of sliding contact with the train wire, wherein
a plurality of grooves extending upward from a lower end part of the contact member body are formed in a contact-side surface of the contact member body, and
the plurality of grooves are formed so that upper ends of the grooves are positioned at a lower part of a contact surface which comes into sliding contact with the train wire,
wherein the vehicle runs in first and second directions being opposite to each other,
the plurality of grooves includes a first groove and a second groove,
the first groove is inclined so that the lower end of the first groove is positioned on the rear side of the upper end of the first groove with respect to the first direction of the vehicle, and thereby rainwater entering onto the contact surface flows along at least the first groove when the vehicle is running in the first direction, and
the second groove is inclined so that the lower end of the second groove is positioned on the rear side of the upper end of the second groove with respect to the second direction of the vehicle, and thereby rainwater entering onto the contact surface flows along at least the second groove when the vehicle is running in the second direction.

2. A current collecting contact member comprising:
a current collecting contact member body which is arranged on the side surface of a vehicle so as to face a train wire laid near a track of the vehicle; is configured so as to collect electric power from the train wire by means of sliding contact with the train wire; has a lower contact surface and an upper contact surface, which come into sliding contact with the train wire; and is configured so that after the lower contact surface has been worn out, the upper contact surface is used by turning the current collecting contact member upside down, wherein
a plurality of grooves extending upward from a lower end part of the contact member body are formed in a contact-side surface of the contact member body, and also a plurality of grooves extending downward from an upper end part of the contact member body are formed in the contact-side surface of the contact member body, and
the plurality of grooves extending from the lower end part are formed so that upper ends of the grooves extending from the lower end part are positioned at a lower part of the lower contact surface which comes into sliding contact with the train wire, and the plurality of grooves extending from the upper end part are formed so that lower ends of the grooves extending from the upper end part are positioned at an upper part of the upper contact surface which comes into sliding contact with the train wire,
wherein the vehicle runs in first and second directions being opposite to each other, the plurality of grooves extending from the lower end part includes a first groove and a second groove, and the plurality of grooves from the upper end part includes a third groove and a fourth groove, the first groove is inclined so that the lower end of the first groove is positioned on the rear side of the upper end of the first groove with respect to the first direction of the vehicle, and thereby rainwater entering onto the contact surface flows along at least the first groove when the vehicle is running in the first direction, the second groove is inclined so that the lower end of the second groove is positioned on the rear side of the upper end of the second groove with respect to the second direction of the vehicle, and thereby rainwater entering onto the contact surface flows along at least the second groove when the vehicle is running in the second direction, in the case that the current collecting contact member body is turned upside down, the third groove is inclined so that the lower end of the third groove is positioned on the rear side of the upper end of the third groove with respect to the first direction of the vehicle, and thereby rainwater entering onto the contact surface flows along at least the third groove when the vehicle is running in the first direction, and in the case that the current collecting contact member body is turned upside down, the fourth groove is inclined so that the lower end of the fourth groove is positioned on the rear side of the upper end of the fourth groove with respect to the second direction of the vehicle, and thereby rainwater entering onto the contact surface flows along at least the fourth groove when the vehicle is running in the second direction.

* * * * *